(12) United States Patent
Steputis

(10) Patent No.: US 10,165,888 B2
(45) Date of Patent: Jan. 1, 2019

(54) HEATING AND COOKING SYSTEM

(71) Applicant: David Gordon Steputis, Golden, CO (US)

(72) Inventor: David Gordon Steputis, Golden, CO (US)

( * ) Notice: Subject to any disclaimer, the term of this patent is extended or adjusted under 35 U.S.C. 154(b) by 227 days.

(21) Appl. No.: 15/263,678

(22) Filed: Sep. 13, 2016

(65) Prior Publication Data

US 2017/0079460 A1    Mar. 23, 2017

Related U.S. Application Data

(60) Provisional application No. 62/220,396, filed on Sep. 18, 2015.

(51) Int. Cl.
*A47J 37/07*    (2006.01)
*F24B 1/20*     (2006.01)
(Continued)

(52) U.S. Cl.
CPC ............ *A47J 27/002* (2013.01); *A47J 36/00* (2013.01); *A47J 36/02* (2013.01); *A47J 36/38* (2013.01);
(Continued)

(58) Field of Classification Search
CPC .. F24B 1/207; F24B 1/202; F24B 1/20; F24B 1/26; F24B 7/002; A47J 37/0704;
(Continued)

(56) References Cited

U.S. PATENT DOCUMENTS

| 20,430 A | * | 6/1858 | Horton | F24B 7/002 |
| | | | | 126/6 |
| 26,048 A | * | 11/1859 | Osbrey | A01G 13/06 |
| | | | | 431/203 |

(Continued)

FOREIGN PATENT DOCUMENTS

| FR | 2646336 A1 * | 11/1990 | ............ A47J 37/041 |
| WO | 2010/118304 A1 | 10/2010 | |

(Continued)

OTHER PUBLICATIONS

Rocketstove Big Max Part 3, The Final (Heideveld B.) Apr. 3, 2012, Retrieved from the Internet on Nov. 9, 201. URL: <https://www.youtube.com/watch?tv=0DCyGRzR-z4>.

(Continued)

*Primary Examiner* — Gregory Huson
*Assistant Examiner* — Daniel E Namay
(74) *Attorney, Agent, or Firm* — James A. Sheridan; Sheridan Law, LLC

(57) ABSTRACT

Systems and methods of use pertaining to a rocket-type heating and cooking system feature three distinct cooking surfaces designed for simultaneous use and may be dismantled and transported for use in a variety of environments, including use as a heating and cooking device in the home as a fireplace insert, use outdoors in a hiking or camping setting, or use in a developing-world application as a third-world outdoor or indoor kitchen. The heating and cooking system features a combustion chamber and exhaust chimney having optimized dimensions to achieve maximum combustion efficiency, which translates to increased heating and cooking capacities as well as reduced smoke exhaustion. Other embodiments are also disclosed.

20 Claims, 19 Drawing Sheets

(51) Int. Cl.
| | |
|---|---|
| *F24B 1/26* | (2006.01) |
| *A47J 27/00* | (2006.01) |
| *A47J 36/00* | (2006.01) |
| *A47J 36/02* | (2006.01) |
| *A47J 36/38* | (2006.01) |
| *A01G 13/06* | (2006.01) |
| *F24B 1/182* | (2006.01) |
| *F24B 7/00* | (2006.01) |

(52) U.S. Cl.
CPC .......... *A47J 37/0763* (2013.01); *F24B 1/207* (2013.01); *F24B 1/26* (2013.01); *A01G 13/06* (2013.01); *A47J 2037/0777* (2013.01); *A47J 2201/00* (2013.01)

(58) Field of Classification Search
CPC ...... A47J 37/0763; A47J 27/002; A47J 36/00; A47J 36/02; A47J 36/38; A47J 2037/0777; A47J 2201/00; A47J 33/00; Y02B 40/163; A01G 13/06
USPC ................ 126/275 R, 29, 273 R, 25 R, 28
See application file for complete search history.

(56) References Cited

U.S. PATENT DOCUMENTS

| | | | | |
|---|---|---|---|---|
| 81,039 A * | 8/1868 | Vedder | A47J 37/07 126/28 |
| 124,347 A * | 3/1872 | Ferris | A47J 37/0763 126/9 R |
| 129,049 A * | 7/1872 | Oakley | A47J 37/0763 126/9 R |
| 130,228 A * | 8/1872 | Lovell | A47J 37/0704 126/25 R |
| 139,760 A * | 6/1873 | Bond | A47J 37/07 126/28 |
| 148,970 A * | 3/1874 | Moore | A47J 37/0763 126/9 R |
| 244,859 A * | 7/1881 | Corby | A47J 37/07 126/28 |
| 264,627 A * | 9/1882 | Clifford | F24B 1/207 126/9 R |
| 352,651 A * | 11/1886 | Lineff et al. | F24B 1/207 126/276 |
| 478,874 A * | 7/1892 | Loth | A47J 37/07 126/28 |
| 698,478 A * | 4/1902 | Ehrlich | A47J 37/0704 126/15 R |
| 875,216 A * | 12/1907 | Ruhmann | F24B 1/205 126/29 |
| 894,432 A * | 7/1908 | Grundy | A47J 37/07 126/15 R |
| 1,066,595 A * | 7/1913 | Freeman | F24B 1/205 126/29 |
| 1,118,537 A * | 11/1914 | Dodds | A47J 37/0763 126/9 R |
| 1,141,934 A * | 6/1915 | Charles | F24B 1/205 126/29 |
| 1,145,691 A * | 7/1915 | Lajcak | A47J 37/0704 126/25 R |
| 1,171,859 A * | 2/1916 | Leonard | A47J 37/0763 126/9 R |
| 1,222,325 A * | 4/1917 | Robertson et al. | A47J 37/0763 126/9 R |
| 1,391,778 A * | 9/1921 | Kessler, Sr. | F24B 1/20 126/1 AC |
| 2,113,012 A * | 4/1938 | Albrecht | F24B 1/202 126/29 |
| 2,237,081 A | 4/1941 | Owens | |
| 2,334,847 A | 11/1943 | Spiers | |
| 2,589,073 A * | 3/1952 | Gilbert | F24B 1/202 126/1 AB |
| 2,787,260 A * | 4/1957 | Williams | F24B 1/202 126/214 A |
| 3,561,348 A * | 2/1971 | Weir, Sr. | A47J 37/06 126/25 R |
| 3,882,767 A | 5/1975 | Oyler et al. | |
| 3,991,666 A | 11/1976 | Tidwell et al. | |
| 5,203,316 A * | 4/1993 | Pritchett | E04H 15/14 126/15 R |
| 5,467,691 A | 11/1995 | Koziol | |
| 6,199,549 B1 * | 3/2001 | Yerkes | F24B 1/207 126/276 |
| D612,662 S | 3/2010 | Lorenz et al. | |
| D640,497 S | 6/2011 | Lorenz et al. | |
| 8,261,657 B2 | 9/2012 | Serra et al. | |
| D686,444 S | 7/2013 | Lorenz et al. | |
| 8,899,222 B2 | 12/2014 | DeFoort et al. | |
| D722,811 S | 2/2015 | Walker et al. | |
| D727,677 S | 4/2015 | Walker et al. | |
| 2010/0258104 A1 | 10/2010 | DeFoort et al. | |
| 2014/0116411 A1* | 5/2014 | Jewett | F24B 1/195 126/19 R |
| 2014/0123972 A1 | 5/2014 | Prapas et al. | |
| 2015/0034064 A1 | 2/2015 | Villarreal Escamilla et al. | |
| 2015/0083108 A1 | 3/2015 | DeFoort et al. | |
| 2015/0201805 A1* | 7/2015 | Cedar | A47J 37/0754 126/25 R |
| 2016/0363324 A1* | 12/2016 | Barry | F24B 5/025 |

FOREIGN PATENT DOCUMENTS

| | | | |
|---|---|---|---|
| WO | 2013/051923 A1 | 4/2013 | |
| WO | 2014074642 A1 | 5/2014 | |

OTHER PUBLICATIONS

The "4 Block" Rocket Stove!—DIY Rocket Stove—(Concrete/Cinder Block Rocket Stove)—Simple DIY (DESERTSUN02) Nov. 9, 2013, Retrieved from the Internet on Nov. 4, 2016. URL: <https://www.youtube.com/watch?v=kmDYUrVHPWc>.
Build a NICE Rocket Stove—For About 10 Bucks! (TEXASPREPPER2) Dec. 21, 2013. Retrieved from the Internet on Nov. 9, 2016, URL: <https://www.youtube.com/watch?v=KDU3-y8tFEA&t=769s>.
Rocket Stove Ideas 11—Horizontal cook stove.wmv (Leskela P.) Feb. 25, 2013. Retrieved from the Internet on Nov. 9, 2016. URL: <https://www.youtube.com/watch?v=jxcP7IR2Qo4>.
Rocket Stove in the making—Version 1 (Harmon J.) Apr. 21, 2013. Retrieved from the Internet on Nov. 9, 2016. URL: <https://www.youtube.com/watch?v=TGV5Avf9GDQ&t=39s>.
Self-Sufficient—Rocket Stove 2.0 (Gordon D.) Sep. 26, 2015. Retrieved from the Internet on Nov. 4, 2016. URL: <http://beforeitsnews.com/self-sufficiency/2015/09/fema-proof-2-0-2494848.html>.
International Search Report and Written Opinion for International Application No. PCT/US16/51456 dated Dec. 1, 2016, 14 pp.
Onil Products, Products for poverty reduction—Welcome to Onil Poverty Reduction Products, Wordpress webpage, accessed on Aug. 23, 2015.

* cited by examiner

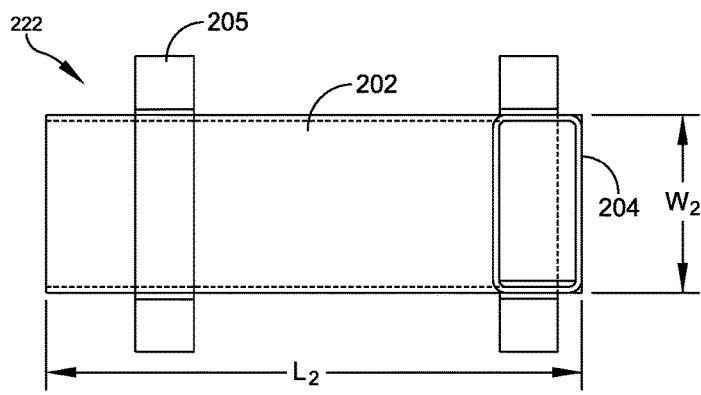
FIG. 12A
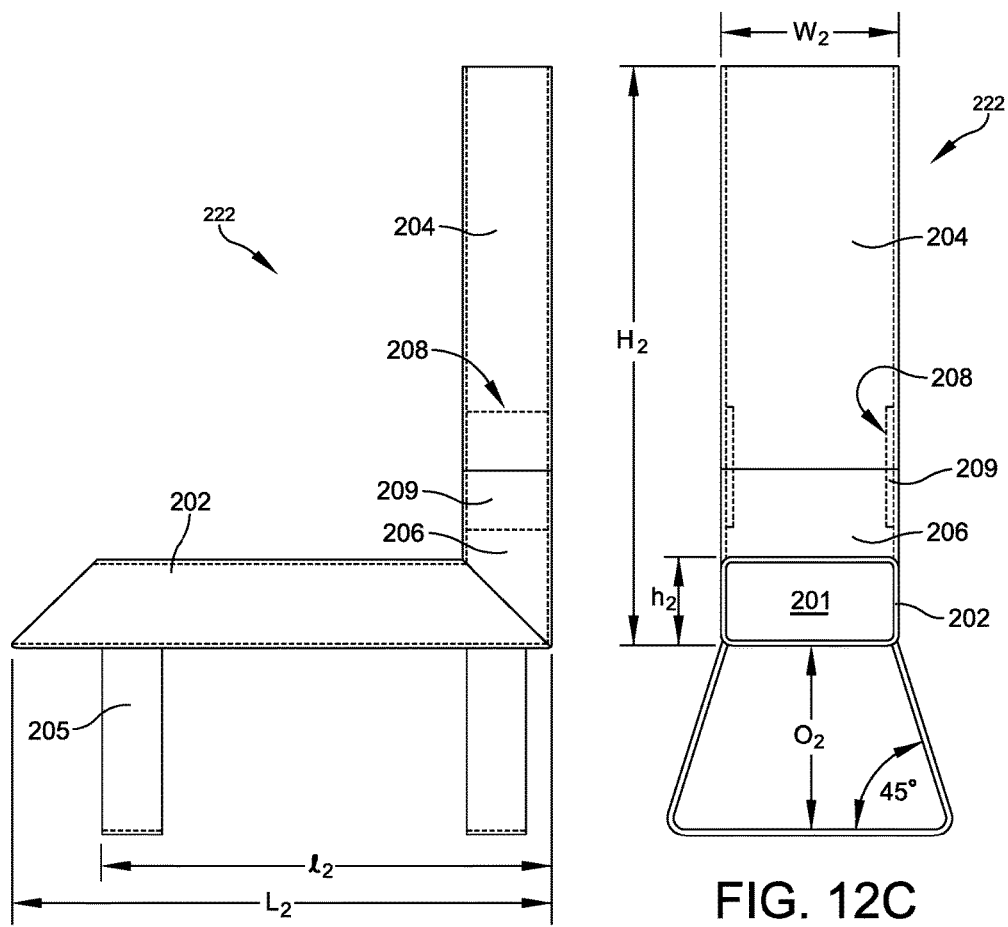
FIG. 12B
FIG. 12C

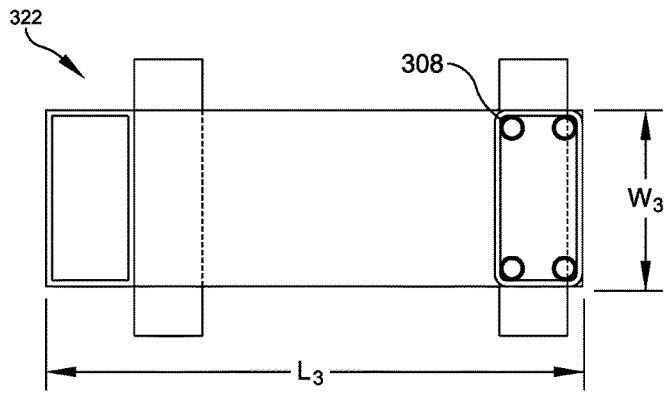
FIG. 15A
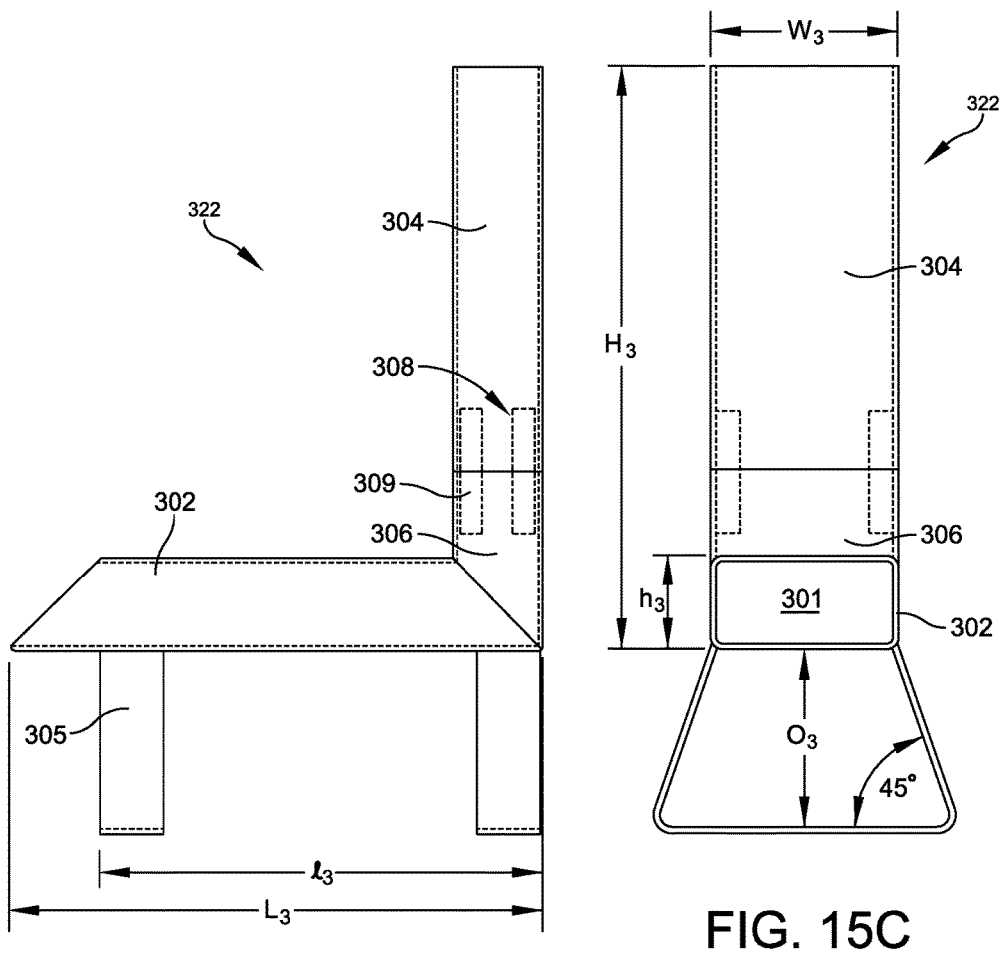
FIG. 15B
FIG. 15C

HEATING AND COOKING SYSTEM

REFERENCE TO PENDING PRIOR PATENT APPLICATION

This application claims the benefit under 35 U.S.C. 119(e) of U.S. Provisional Patent Application No. 62/220,396, filed Sep. 18, 2015 by David Gordon Steputis for "HEATING AND COOKING SYSTEM," which patent application is hereby incorporated herein by reference.

BACKGROUND

Numerous mechanisms exist to convert a fuel source into heat, either in an indoor or outdoor domestic environment, which may then be used for the secondary purpose of cooking food and/or heating liquids. One specific type of stove is known as a "rocket stove," which is an efficient cooking stove that generally features a simple high-temperature combustion chamber in communication with a vertical chimney, as well as a heat exchanger designed to transfer heat to where it is needed (e.g., to a cooking pot). The combustion chamber/chimney combination ensures proper air draft into the combustion chamber and an almost complete, high-temperature combustion of natural fuels (e.g., wood, pine cones, dried grasses) burning within the chamber. As fuel burns, convection draws new air into the combustion chamber from below and, due to the fact that heat rises, evacuates heated smoke or exhaust from the fire through the chimney. Under the right conditions, the acceleration of air flow from the restricted combustion chamber, or firebox, up and out the chimney causes a roaring sound, rather like that of a rocket engine.

FIGS. 1A-1F show a number of examples of existing rocket-type stoves in that each combines a combustion chamber and a chimney to exhaust smoke.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

One embodiment provides a heating and cooking system. The heating and cooking system may include a combustion chamber bounded by top and bottom surfaces, an air intake, and an air exhaust, wherein the combustion chamber is configured to contain an amount of natural fuel. The system may also include a vertical chimney in fluid communication with the air exhaust of the combustion chamber. The top surface bounding the combustion chamber may be configured to transfer heat to a first cooking surface. The bottom surface bounding the combustion chamber may be configured to transfer heat to a second cooking surface, and the vertical chimney may be configured to transfer heat to a third cooking surface.

Another embodiment provides a portable, high-efficiency system for heating and cooking. The system may include (1) an enclosed combustion chamber, the enclosed combustion chamber having a first end forming an air intake and a second end forming an air outlet; (2) a vertical exhaust, the vertical exhaust having a first end in fluid communication with an ambient environment and a second end in fluid communication with the air outlet of the enclosed combustion chamber, wherein: (a) the air intake of the enclosed combustion chamber has a width-to-height aspect ratio of 2:1; and (b) a length of the vertical exhaust and a length of the enclosed combustion chamber have a length-to-length ratio of 4:3.

Yet another embodiment provides a multi-functional rocket stove. The rocket stove may include a combustion tube forming a combustion chamber having an air inlet therein, the combustion tube coupled with a vertical exhaust such that air flowing into the system via the air inlet of the combustion chamber exits the system via the vertical exhaust. A width-to-height ratio of the air inlet and a length-to-length ratio of the vertical exhaust to the combustion chamber may be optimized to achieve maximum fuel efficiency, and the combustion chamber and the vertical exhaust may simultaneously transfer heat to at least three cooking surfaces.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which:

FIGS. 12A-12C illustrate respective top, side, and front views of one embodiment of a stove subassembly of the heating and cooking system of FIGS. 10-11;

FIGS. 15A-15C illustrate respective top, side, and front views of one embodiment of a stove subassembly of the heating and cooking system of FIGS. 13-14.

DETAILED DESCRIPTION

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Overview

While existing rocket-type stoves address many issues associated with portable heating and cooking, existing variations present numerous challenges. Initially, no existing rocket-type stove has been dimensionally optimized for maximum heat-production and heat-transfer efficiency. While existing stoves may perform more efficiently than an open flame or fire pit, they haven't been proportioned in a manner that creates a consistent intake of oxygen to optimize efficient use of natural (e.g., wood) fuel.

In addition, while some existing rocket-type stoves feature limited cooking surfaces, they do not maximize their heat-transfer potential. No existing stove features a combination of cooking surfaces such as, for example, an oven drawer, a stovetop, and a grill, all designed for simultaneous use during stove operation. Moreover, existing stoves are primarily designed for outdoor use and are not adapted for alternate indoor use as a fireplace insert for home heating. This drawback limits the utility of existing stoves, which cannot fulfill multiple functions, from heating the home to baking potatoes on an outdoor adventure to boiling water in a third-world application. Many existing rocket-type stoves also employ low-grade materials and construction and have multiple moving parts that detract from the safety and utility of the structure.

As a result of these numerous drawbacks, there is a need for an ultra-efficient, high-temperature, multiple-application rocket-type stove having a number of cooking surfaces, which is also portable and suitable for use in a variety of heating and/or cooking environments. Various embodiments of the systems and methods described herein relate a portable, high-efficiency rocket-type stove for use in heating and cooking applications in a variety of ambient environments, including within the home as a fireplace insert or in an outdoor setting such as, for example, during a camping trip or in a third-world environment.

Exemplary Heating and Cooking Systems

Figure 1A:
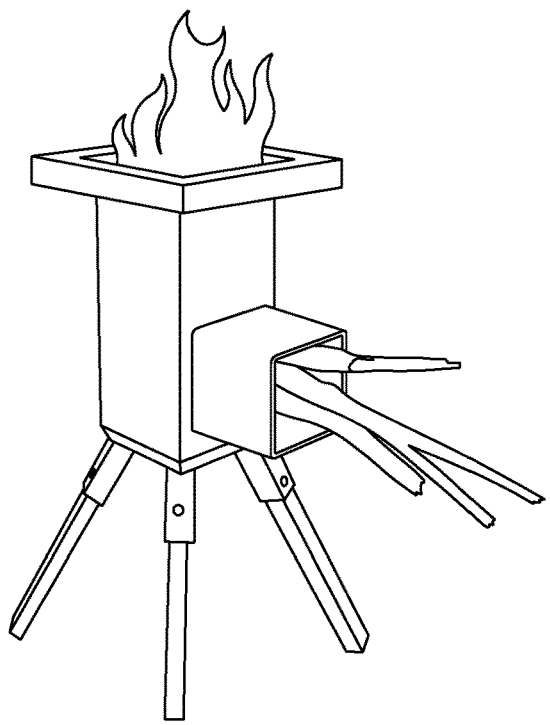
FIGS. 1A-1F illustrate perspective views of numerous exemplary rocket-type stoves existing in the prior art.
Figure 1B:
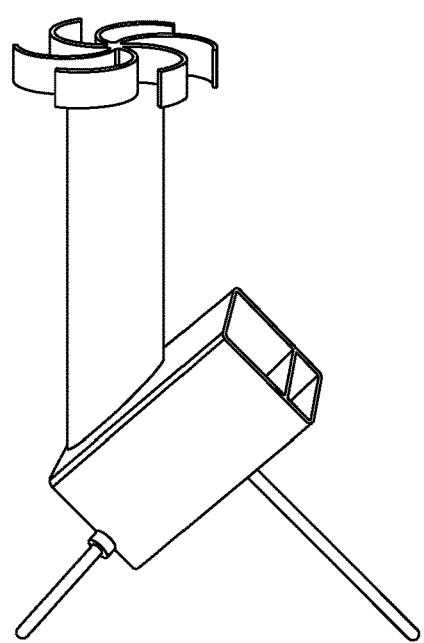
Figure 1C:
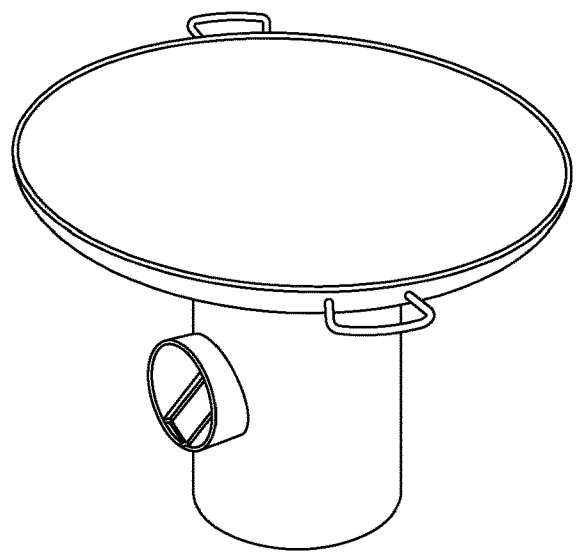
Figure 1D:
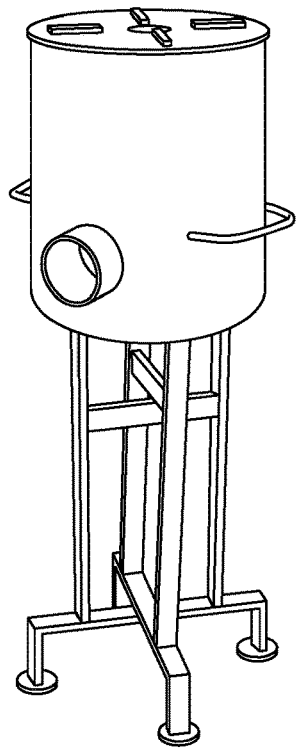
Figure 1E:
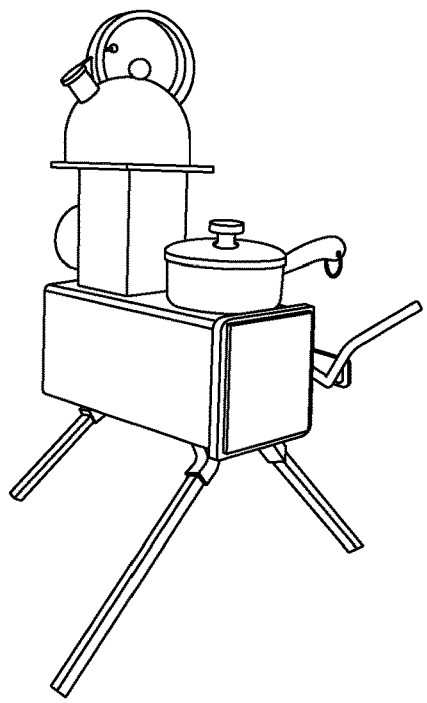
Figure 1F:
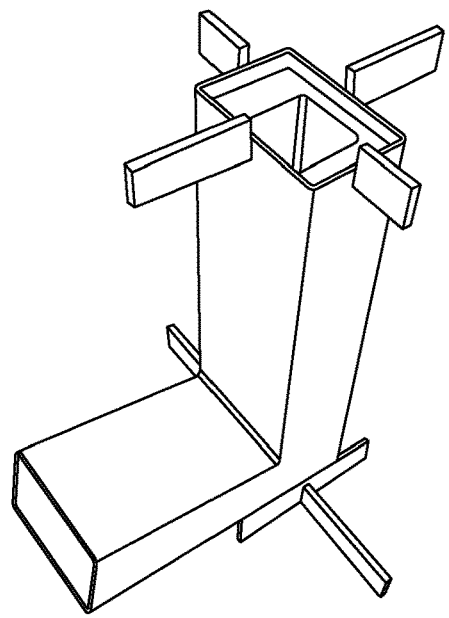
Figure 2:
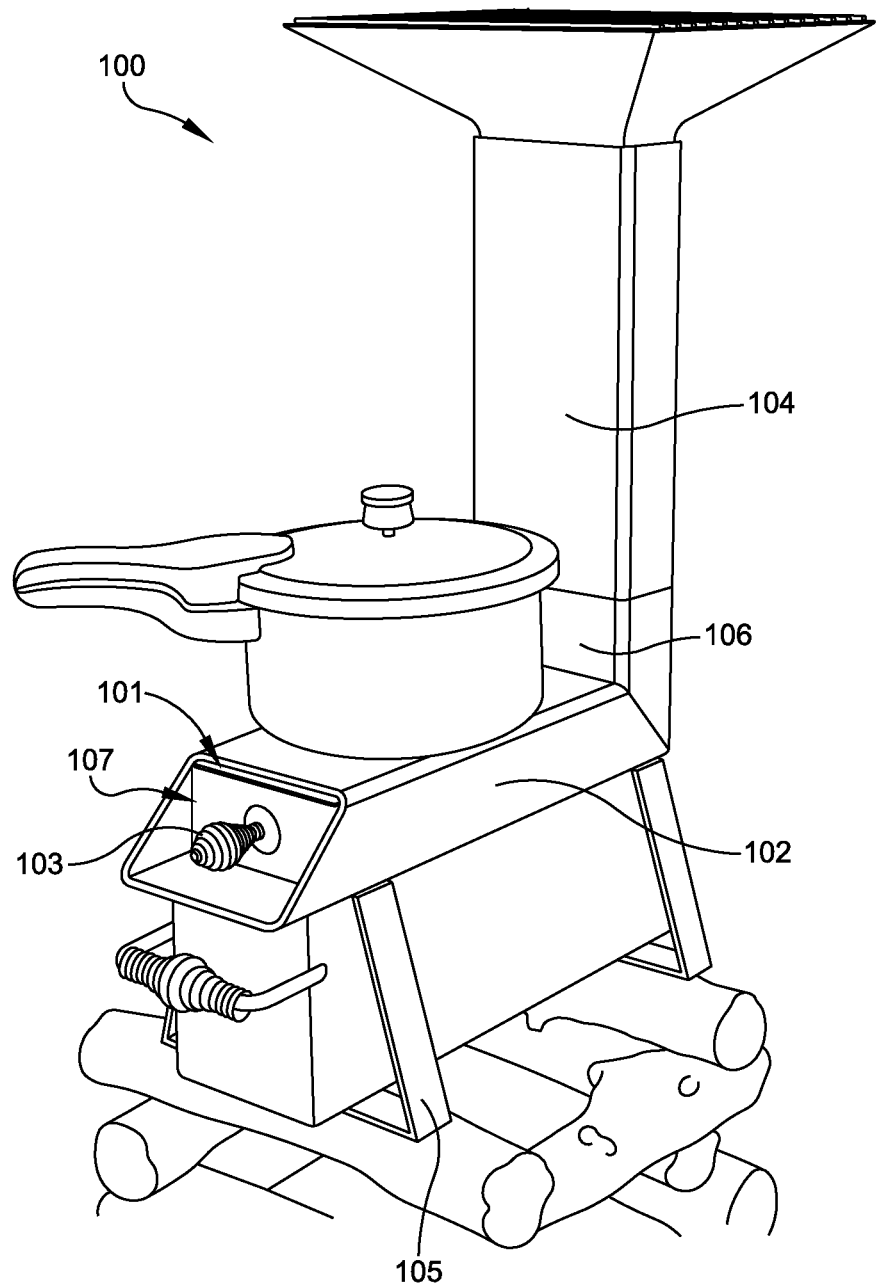
FIG. 2 illustrates a front perspective view of one embodiment of a heating and cooking system.

FIG. 2 illustrates a front perspective view of one embodiment of a heating and cooking system 100. In this embodiment, system 100 includes a horizontal combustion tube 102 that forms an enclosed combustion chamber 101 therein. Combustion chamber 101 is, in turn, in fluid (i.e., air and smoke) communication with a vertical chimney 104. A pair of legs 105 attach to combustion tube 102 to support heating and cooking system 100 upright and offset from the ground. As shown in FIG. 2, combustion tube 102 and vertical chimney 104 may combine to transfer or exchange heat with three cooking surfaces designed for simultaneous use: a stovetop, an oven drawer, and a barbecue grill, or Grilla™. These cooking surfaces will be discussed in detail below in relation to FIGS. 7-9.

Figure 3A:
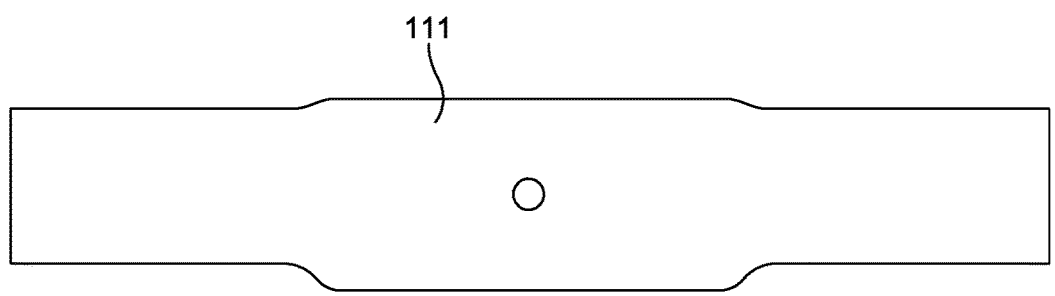
FIG. 3A illustrates a strap component of one embodiment of a draft damper of the system of FIG. 2.
Figure 3B:
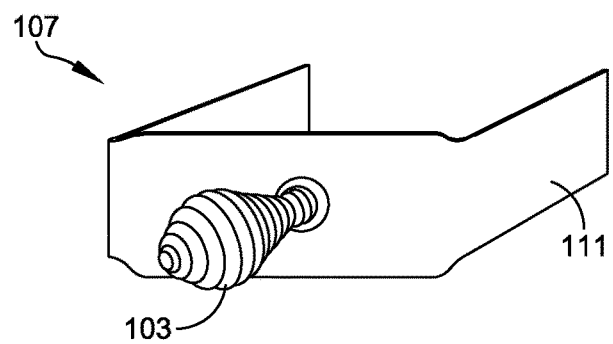
FIG. 3B illustrates one embodiment of a draft damper of the system of FIG. 2.

A draft damper 107, detailed in FIGS. 3A-3B, may be incrementally inserted into an air inlet of horizontal combustion chamber 101 to control air flow through cooking system 100. One embodiment of damper 107 may be formed of a portion of folded sheet steel 111. A handle 103 (FIG. 2) may be added for convenient and incremental insertion into and removal from combustion chamber 101.

Figure 4:
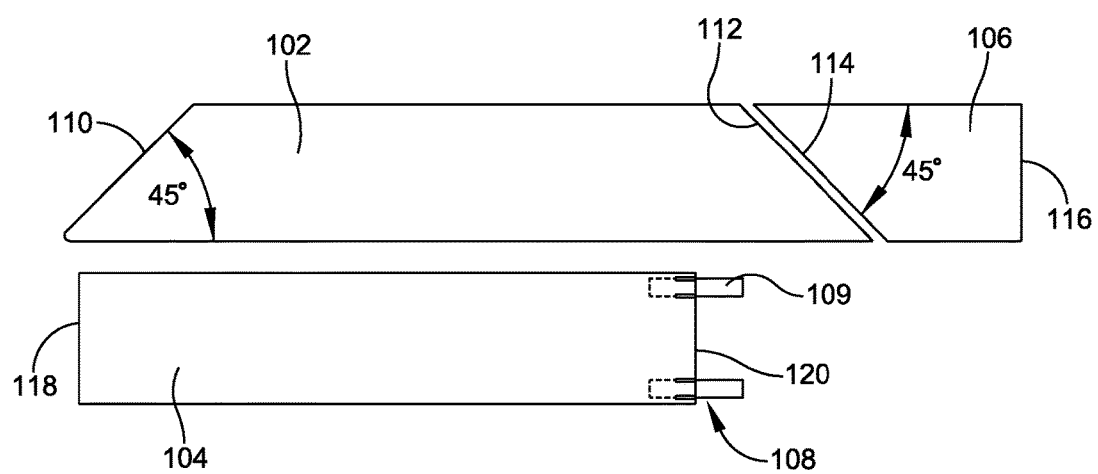
FIG. 4 illustrates a side view of an unassembled combustion tube, vertical insert, and vertical chimney of the heating and cooking system of FIG. 2.
Figure 5A:
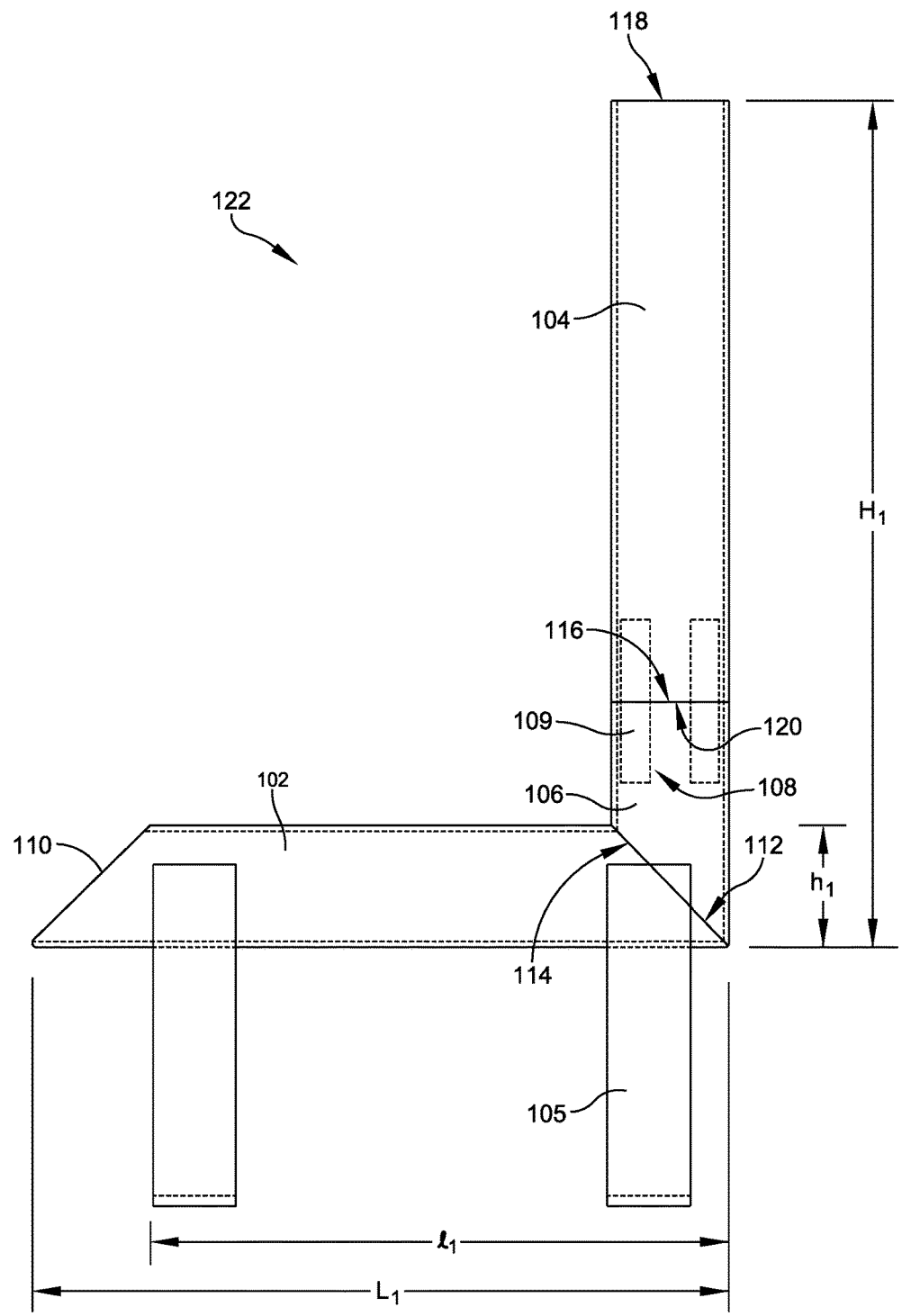
FIGS. 5A-5C illustrate respective side, front, and top views of one embodiment of a stove subassembly of the heating and cooking system of FIG. 2.

FIG. 4 provides a side view of three primary components of system 100, prior to assembly. As shown, combustion tube 102 and vertical chimney 104 may each be formed of pre-fabricated rectangular metal tubing. A vertical insert 106 and a series of metal pegs 108 may be used to removably connect chimney 104 with combustion tube 102 at a 90-degree angle, as shown in FIG. 5A. To achieve this configuration, a first end 110 and a second end 112 of combustion tube 102 may be cut at 45-degree angles. Vertical insert 106 may be cut at a 45-degree angle at its first end 114 and at a 90-degree angle at its second end 116. Vertical chimney 104 may be cut at square 90-degree angles at both first and second ends 118, 120.

Figure 5B:
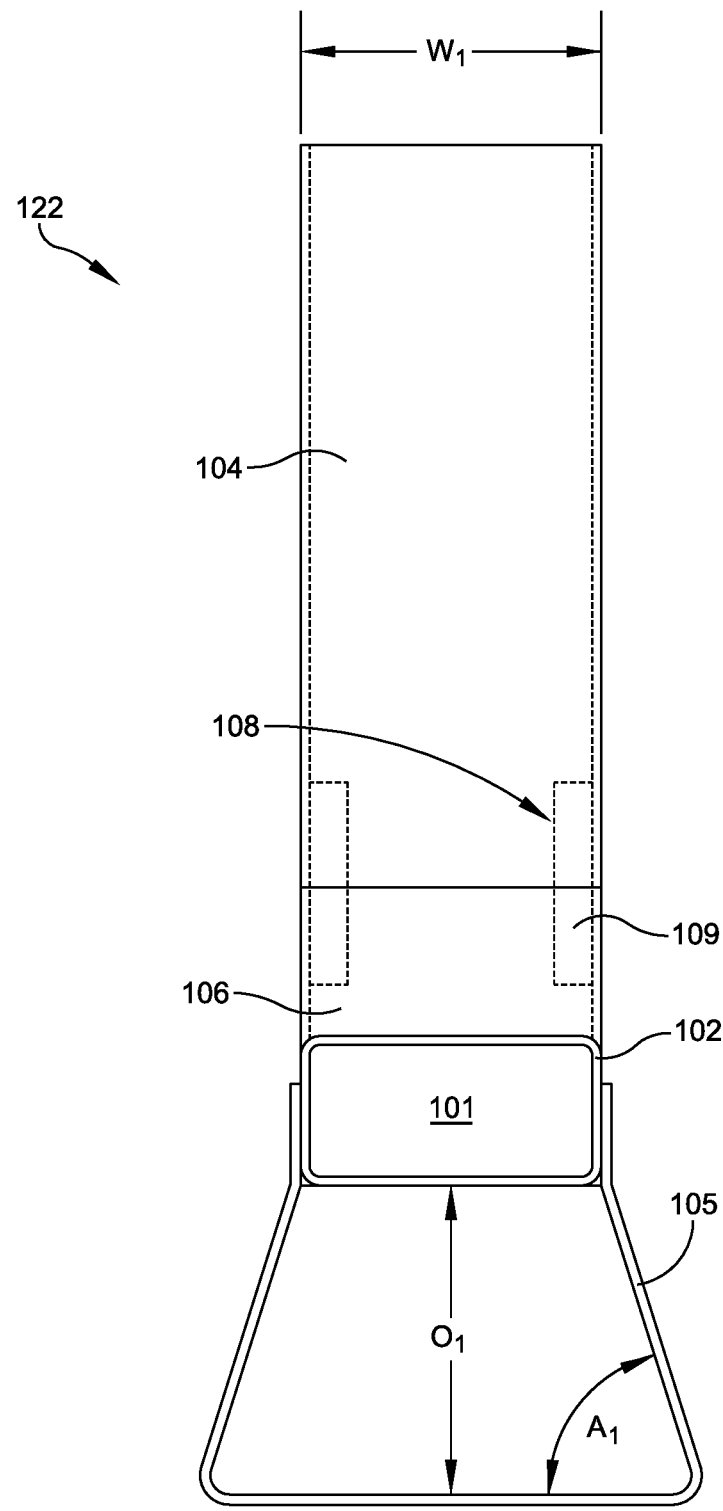
Figure 5C:
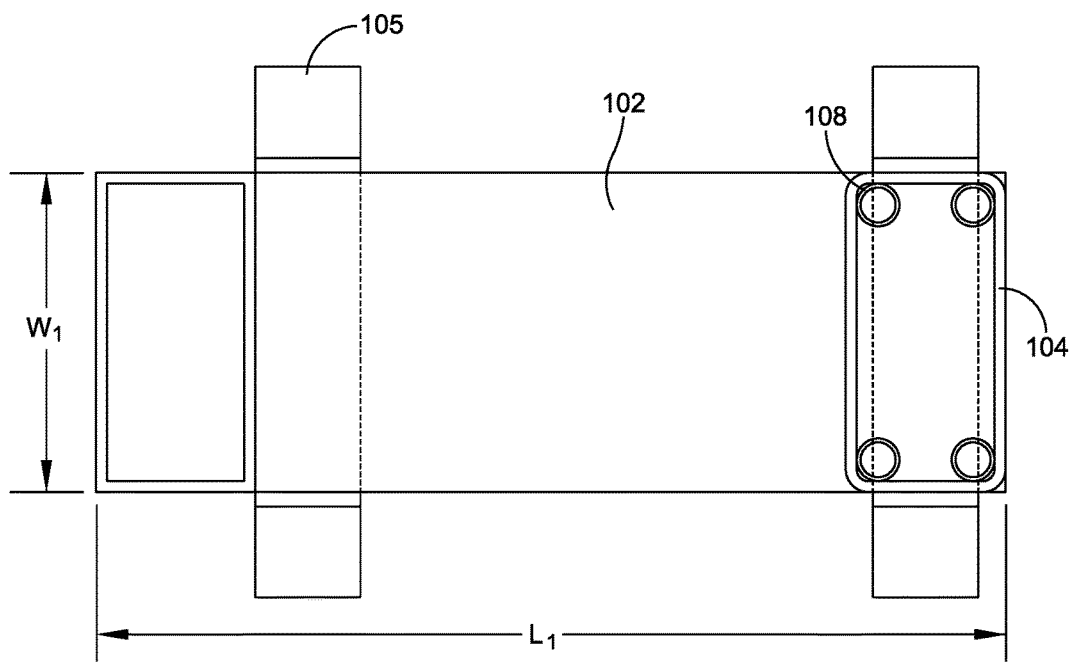

FIGS. 5A-5C show respective side, front, and top views of one embodiment of a stove subassembly 122, which incorporates combustion tube 102 assembled to vertical chimney 104 via vertical insert 106, all supported by legs 105. In this embodiment, first end 114 of vertical insert 106 may be rotated and welded or otherwise attached to second end 112 of combustion tube 102. Pegs 108 may then be welded into second end 120 of chimney 104, such that a protruding portion 109 of each peg 108 may be easily but securely inserted or press fit into and removed from second end 116 of vertical insert 106. Legs 105 may be formed of strap steel that is bent to corresponding angles, A1, of approximately 72.5 degrees and welded or otherwise attached to combustion tube 102 in a configuration that results in a ground offset, $O_1$, of 6.125 inches.

In this embodiment, combustion tube 102, vertical chimney 104, and vertical insert 106 may be formed of 3"×6" steel tubing having a 3/16" wall. However, embodiments of the components may be formed of any appropriate material able to accommodate the design and heat transfer needs, including, for example, aluminum, a composite, or an alloy. In this embodiment, combustion tube 102, vertical chimney 104, and vertical insert 106 may have an assembled height, $H_1$, of approximately 19.5 inches, an assembled length, $L_1$, of approximately 17 inches, and a width, $W_1$, of approximately 6 inches. Combustion tube 102 may have a height, $h_1$, of approximately 3 inches, while combustion chamber may have a length, $I_1$, of approximately 14.625 inches.

Figure 6A:
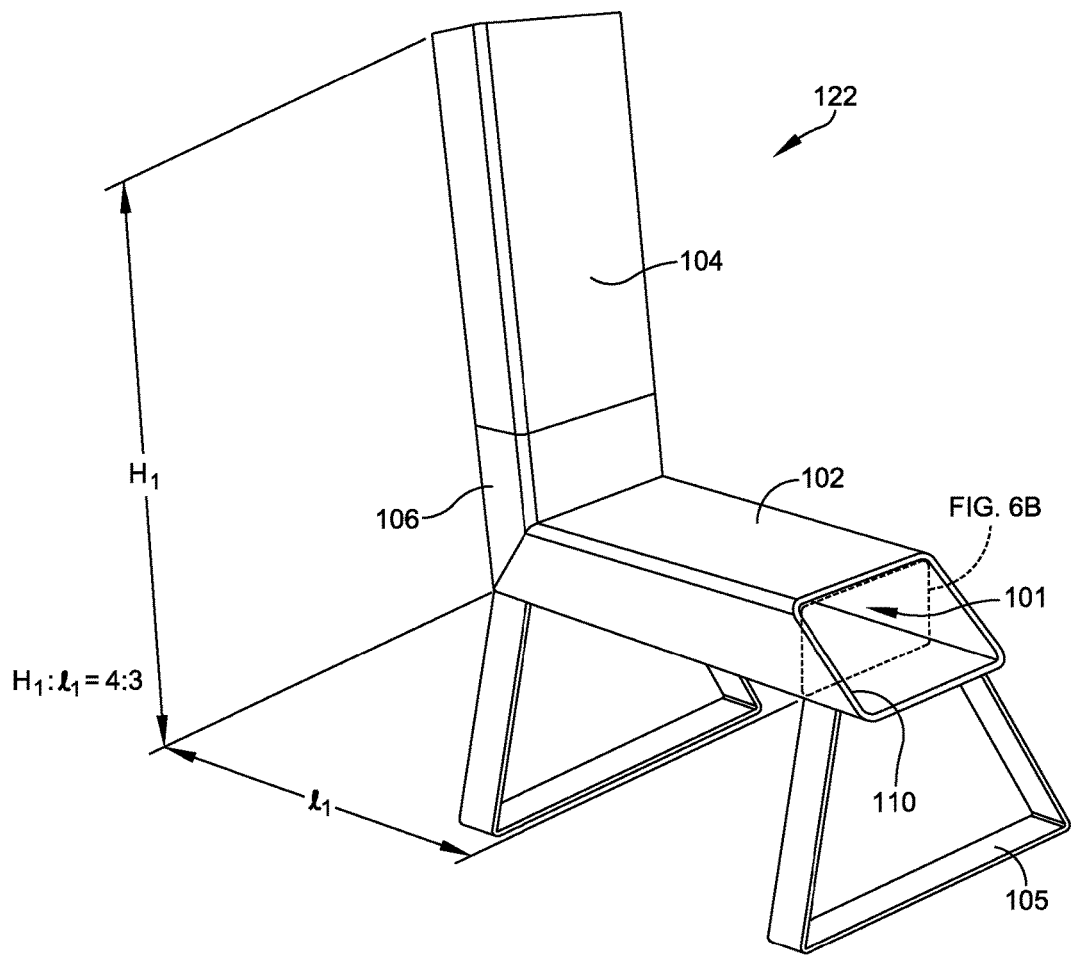
FIG. 6A illustrates a perspective view of the stove subassembly of FIGS. 5A-5C.
Figure 6B:
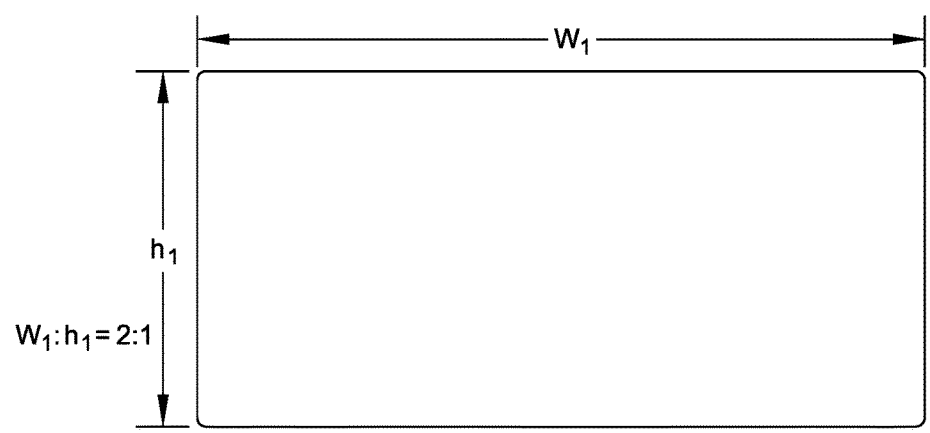
FIG. 6B illustrates an optimized aspect ratio of a combustion chamber air inlet of the stove subassembly of FIGS. 5A-5C and 6A.

FIG. 6A illustrates a perspective view of one embodiment of stove subassembly 122. To maximize combustion efficiency and, as a result, the heat production and smoke reduction capabilities of system 100, the tubing forming air combustion chamber 101 and its air intake may have an optimized width-to-height aspect ratio ($W_1:h_1$) of 2:1, as detailed in FIG. 6B. Moreover, the combined height, $H_1$, of vertical chimney 104 and vertical insert 106 to the length, $I_1$, of combustion chamber 101 may have an optimized length-to-length ratio ($H_1:I_1$) of 4:3. This tested geometric configuration optimizes the Venturi effect of air flowing through system 100 and provides for a consistent intake of oxygen as compared to fuel use, thereby maximizing airflow and stove and fuel efficiency. By optimizing the amount of oxygen flowing through the system, the carbon monoxide (CO) of the natural fuel is burned completely. Particulates are entirely vaporized, and only carbon dioxide ($CO_2$) is given off. As a result, system 100 produces nominal or no smoke, no carbon monoxide, and minimal ash, providing a clean-burning, highly efficient system that is largely self cleaning.

Figure 7A:
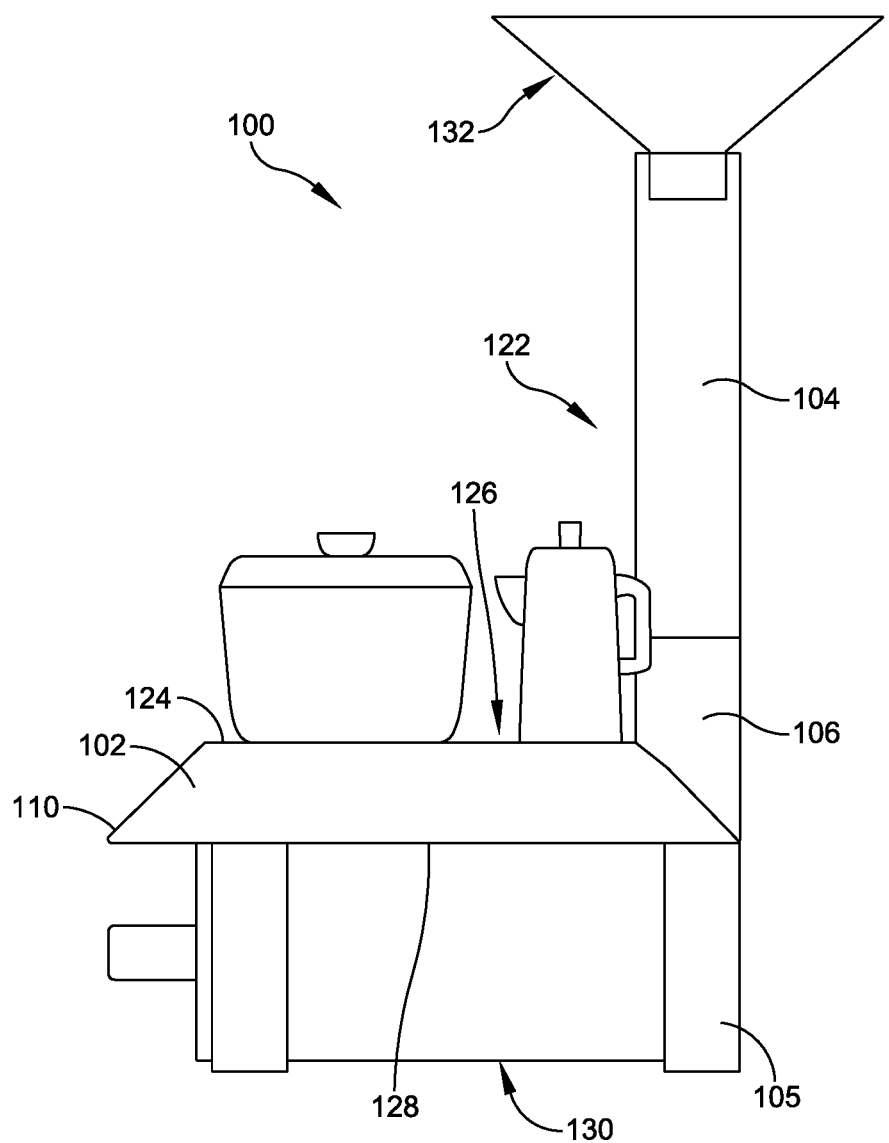
FIGS. 7A-7B illustrate respective side and front views of the heating and cooking system of FIG. 2, featuring a number of cooking surfaces and accessories.
Figure 7B:
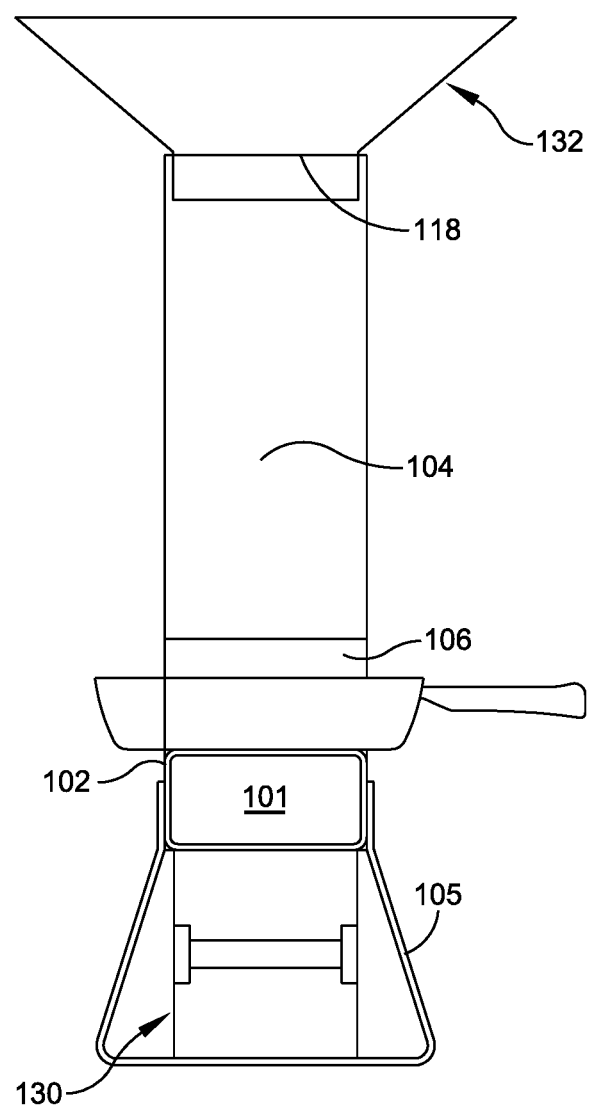
Figure 8A:
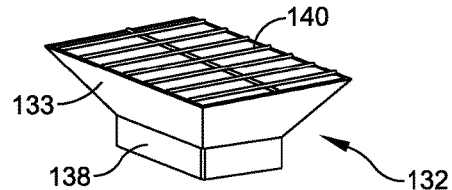
FIGS. 8A-8D illustrate respective perspective, top, front, and side views of a barbecue grill of the heating and cooking system of FIGS. 2 and 7A-7B.
Figure 8C:
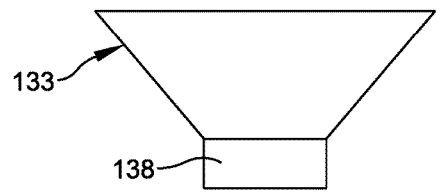
Figure 8B:
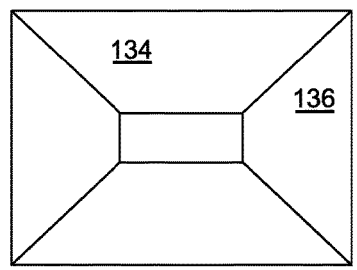
Figure 8D:
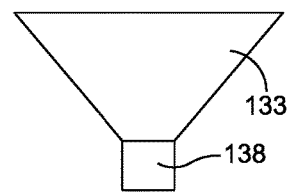

As discussed above, combustion tube 102 and vertical chimney 104 may combine to exchange heat with three cooking surfaces designed for simultaneous use. FIGS. 7A-7B illustrate respective side and front views of system 100, which, in one embodiment, includes assembly 122 outfitted with a number of cooking accessories. First, a top surface 124 of combustion tube 102 may form a stovetop 126. Stovetop 126 may be used in the conventional manner for potted cooking, as well as for boiling water and/or other potable fluids. A bottom surface 128 of combustion tube 102 may act as a heat exchanger that transfers heat to a removable oven drawer 130. Like stovetop 126, oven drawer 130 may be used for traditional cooking operations such as baking and broiling (e.g., of breads, potatoes, etc.). Vertical chimney 104 may exhaust hot air flowing from combustion chamber 101 through a barbecue grill 132, or Grilla™, which may be used to grill meats, vegetables, and/or other foods. Each of these cooking surfaces/accessories benefits from the optimized design and efficiency of stove subassembly 122 (FIGS. 5A-5C and 6A-6B), discussed above, resulting in an optimized heating and cooking system 100.

To further detail the cooking accessories, FIGS. 8A-8D illustrate perspective, top, front, and side views of one embodiment of barbecue grill 132, or Grilla™, for insertion into vertical chimney 104. In this embodiment, grill 132 may take the shape of an inverted pyramid 133 having opposing long and short sides 134 and 136, respectively. Grill 132 may also include a lip 138 configured to engage with open end 118 of vertical chimney 104 (FIGS. 7A-7B). The flat shape of grill 132 may be laser-cut from sheet metal into precise dimensions before it is bended and welded into position. To complete grill 132, a conventional cooking grid 140 may be placed within the opening of pyramid 133. Cooking grid 140 may be a commercially available cooking grid that is ordered to size or, alternatively, cut down to fit within pyramid 133. Other embodiments of grill 132 may have any appropriate size, shape, and/or configuration or be formed of any suitable material for convenient insertion into chimney 104 and subsequent cooking.

Figure 9A:
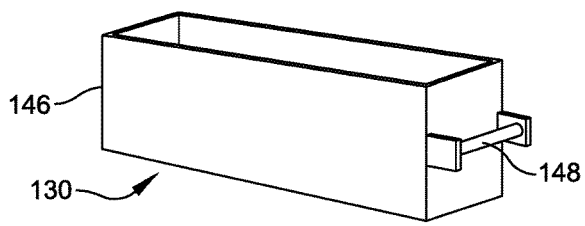
FIGS. 9A-9F illustrate respective perspective, top, side, front, rear, and cross-sectional views of an oven drawer of the heating and cooking system of FIGS. 2 and 7A-7B.
Figure 9D:
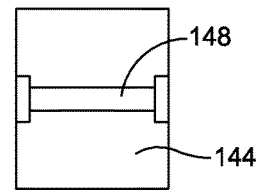
Figure 9B:
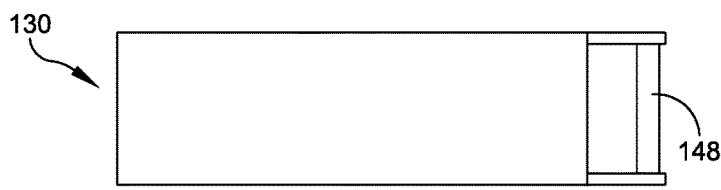
Figure 9E:
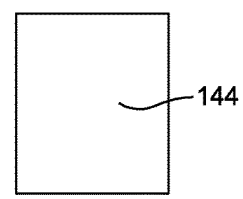
Figure 9C:
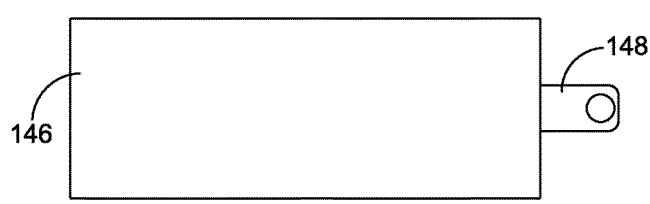
Figure 9F:
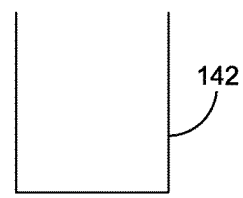

FIGS. 9A-9F illustrate perspective, top, side, front, rear, and cross-sectional views of one embodiment of oven drawer 130 for installation below bottom surface 128 of combustion tube 102 (FIGS. 7A-7B). Like grill 132, oven drawer 130 is designed to require minimal labor for assembly and use. In this embodiment, oven drawer 130 may be formed of a u-shaped sheet metal channel 142 (FIG. 9F). An end plate 144 (FIGS. 9D-9E) may be welded at each end to form an open drawer-like container 146, which may receive foodstuffs for cooking purposes. A handle 148 may be attached to one end of container 146 to assist a user in installing oven drawer 130 beneath bottom surface 128 of combustion tube 102 and between legs 105, as shown in FIGS. 7A-7B. Handle 148 may be formed from a commercially available spring handle or any other appropriate handle formed of heat-tolerant material. When in position, oven drawer 130 receives heat transferred from combustion tube 102, thereby cooking the food contained within drawer 130.

Heating and cooking system 100, complete with its tuned or optimized dimensions and aspect/length ratios for increased heat-transfer efficiency and smoke reduction and its three cooking surfaces designed for simultaneous use, provides a unique solution to the challenges presented by existing rocket-type stoves. System 100 is designed to take advantage of freely available fuel sources, such as, for example, wood, dried grasses, pine cones, and the like. As a result, the user need not transport fuel (e.g., gas, propane, starter logs, etc.) along with the stove. In a similar vein, the optimized configuration of the system (i.e., the specific aspect ratio applicable to combustion tube 102 and the length-to-length ratio applicable to vertical chimney 104 and combustion chamber 101) provide high-efficiency fuel use, heat production, and smoke reduction. Testing has shown that rocket-type stoves provide up to a 10× fuel savings over other heating and cooking mechanisms. System 100 provides a virtually smokeless exhaust and a consistent flame that may be safely and swiftly lit using free fuel sources. The system also requires very little maintenance—it is self-cleaning, wind resistant to protect and contain the clean-burning flame, and simple in design with very few moving parts.

Because system 100 is designed to be sturdy, yet lightweight and portable with its removable chimney 104, the system may be used for multiple purposes in a variety of settings. A user may boil, bake, and barbecue simultaneously. In a recreational outdoor setting, such as camping, hiking, or at the beach, a user may create meals for numerous people, as well as use the stove as a heat source without employing an open campfire-type flame, which risks forest and/or grass fires and leaves its mark on the natural landscape. The system may also be used in developing-world environments as a low-cost alternative for cooking, heating, and boiling and purifying water, essentially providing an economically feasible third-world kitchen that may accommodate the daily needs of ten or more people.

Due to its L-shaped design and easily removable vertical chimney 104, system 100 may even be used in the home as a fireplace insert. A user may remove chimney 104, place system 100 within the fireplace/upon the grate, and reinstall chimney 104 such that chimney 104 exhausts through the built-in home chimney flue. Because the optimized dimensions of they system provide for a largely smokeless exhaust, system 100 is ideal such indoor use with ventilation. This indoor application allows for fireplace rehabilitation and home preparedness in the event the home needs to be heated in a manner that is independent of grid-supplied energy.

Heating and cooking system 100 also boasts low-cost materials and simple fabrication techniques that allow the system to be built anywhere in the world. This opens up possibilities for open-source manufacturing techniques in which the system may be fabricated locally, based on plans provided via email, online, or otherwise. As a result, system 100 may be quickly and efficiently built and placed into use anywhere on earth, opening a range of both business opportunities and ways to improve the quality of life for people living in regions compromised by low water quality, energy scarcity, and disease.

Figure 10:
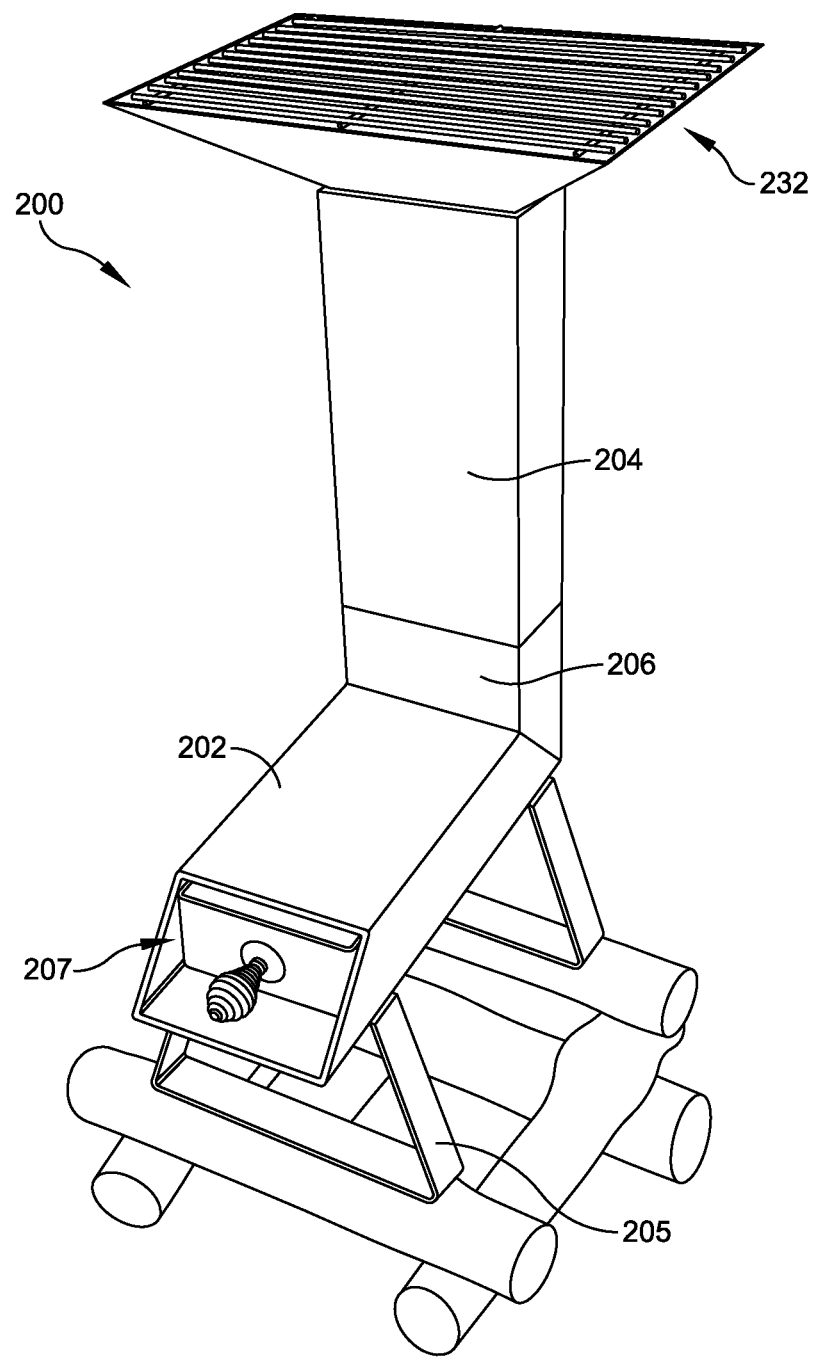
FIG. 10 illustrates a front perspective view of another embodiment of a heating and cooking system.
Figure 11:
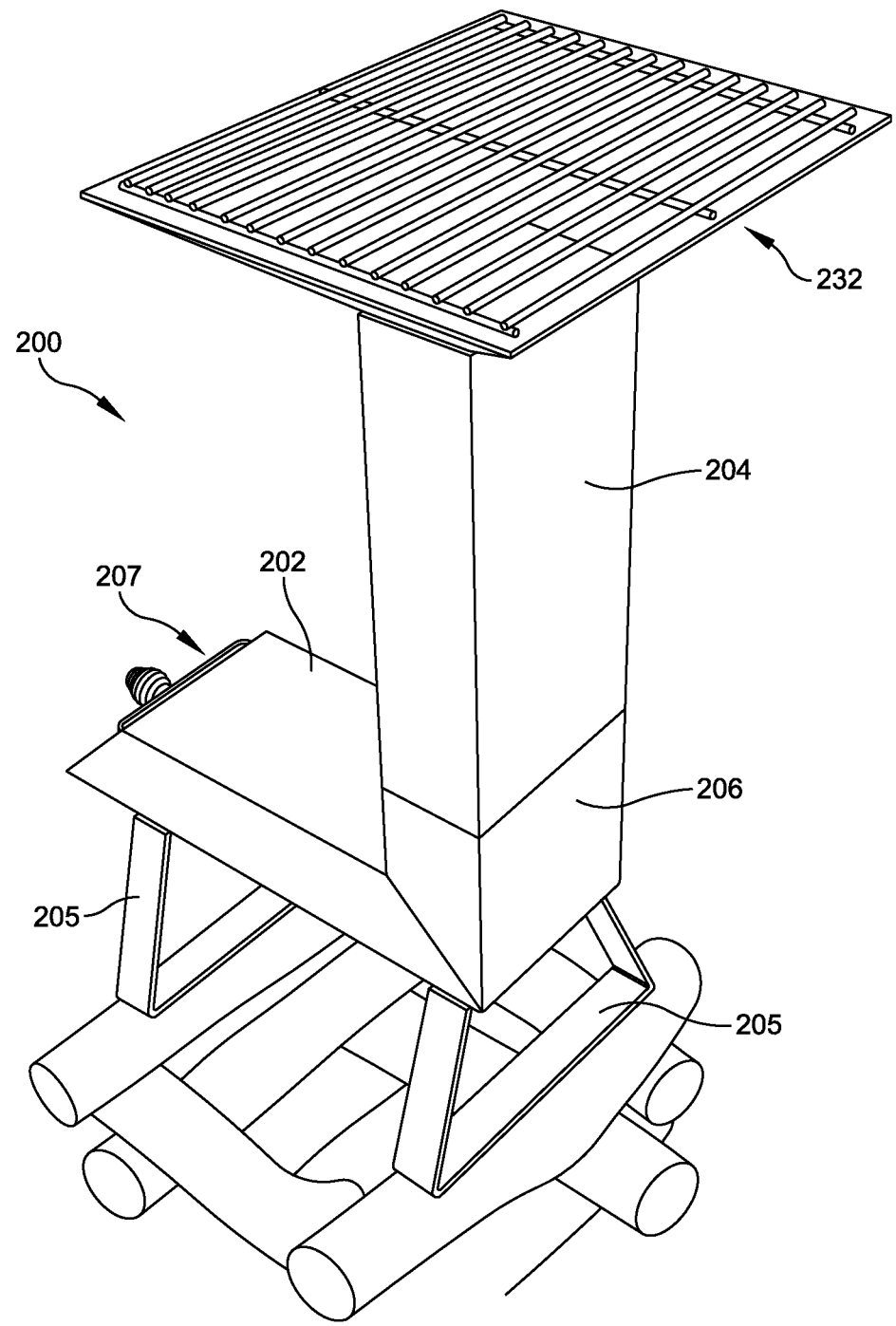
FIG. 11 illustrates a rear perspective view of the heating and cooking system of FIG. 10.

The design framework and attendant benefits discussed above apply to additional heating and cooking system embodiments. FIGS. 10-11 illustrate respective front and rear perspective views of another embodiment of a heating and cooking system 200. System 200 is similar to system 100, discussed above, in both design and functionality, but system 200 may be formed from aluminum, allowing for a robust, yet lighter weight and even more easily portable alternative. In this embodiment, system 200 may include a horizontal combustion tube 202 that connects at a right angle with vertical chimney 204 via a vertical insert 206. Combustion tube 202 may be supported by a pair of legs 205.

The exemplary assembly accessories discussed above in relation to steel system 100 may be modified as appropriate for system 200. For example, a draft damper 207, a grill 232, and an oven drawer (not shown) may be formed from aluminum as appropriate and/or desired.

FIGS. 12A-12C illustrate respective top, side, and front views of a subassembly 222 of heating and cooking system 200. In this embodiment, a set of plates 208 may be used to removably connect vertical chimney 204 with vertical insert 206. A portion of each plate 208 may be welded or otherwise affixed within vertical chimney 204 such that protruding portions 209 of plates 208 may be inserted or press fit into and removed from vertical insert 206 for easy assembly and disassembly. Plates 208 may be used as appropriate and/or desired and may be employed in lieu of pegs 108, discussed above in relation to system 100.

The dimensions of system 200 may be scaled as appropriate for the material and/or application. A width-to-height aspect ratio, however, of combustion tube 202 ($W_2:h_2$) may remain at 2:1, and a length-to-length ratio of a combined height, $H_2$, of vertical chimney 204 and vertical insert 206 to a length, $I_2$, of combustion chamber 201 ($H_2:I_2$) may remain at 4:3 to provide a tuned system that is optimized to achieve maximum heating and fuel efficiency. In one embodiment, an assembled length, $L_2$, and a ground offset $O_2$ may be scaled as appropriate or may approximate the assembled length, $L_1$, and the ground offset, $O_1$, discussed above in relation to system 100.

Figure 13:
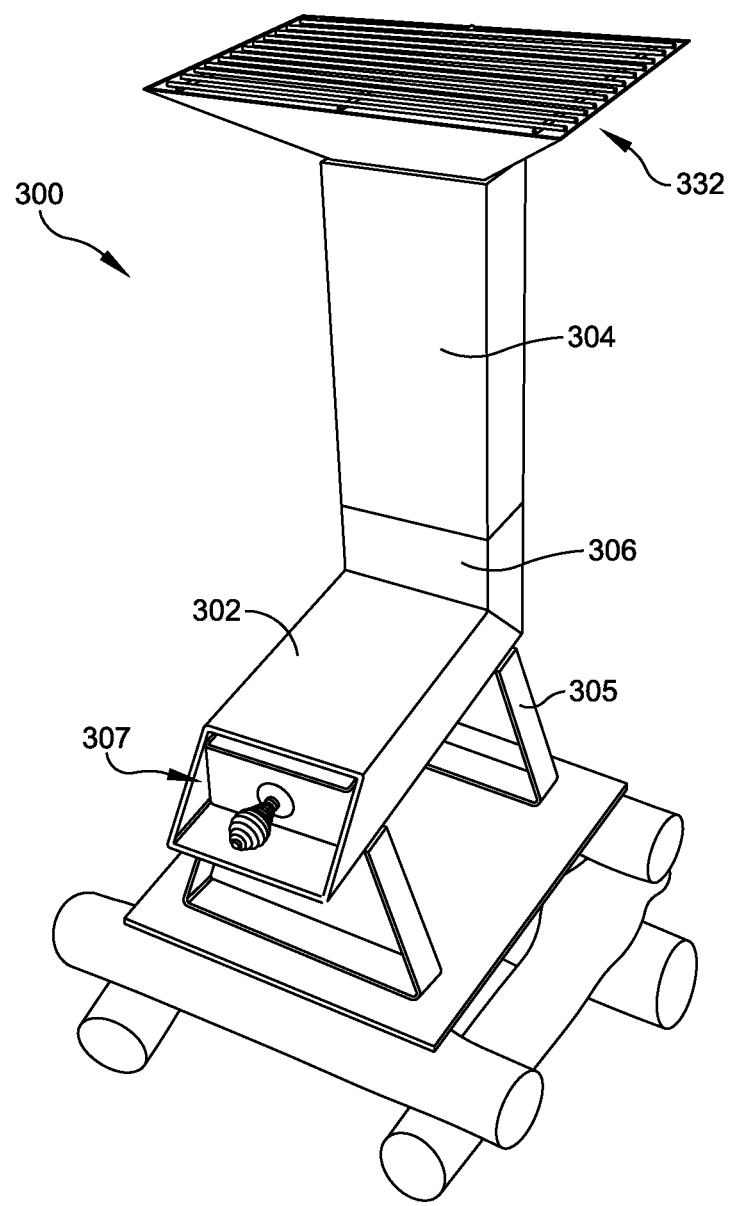
FIG. 13 illustrates a front perspective view of yet another embodiment of a heating and cooking system.
Figure 14:
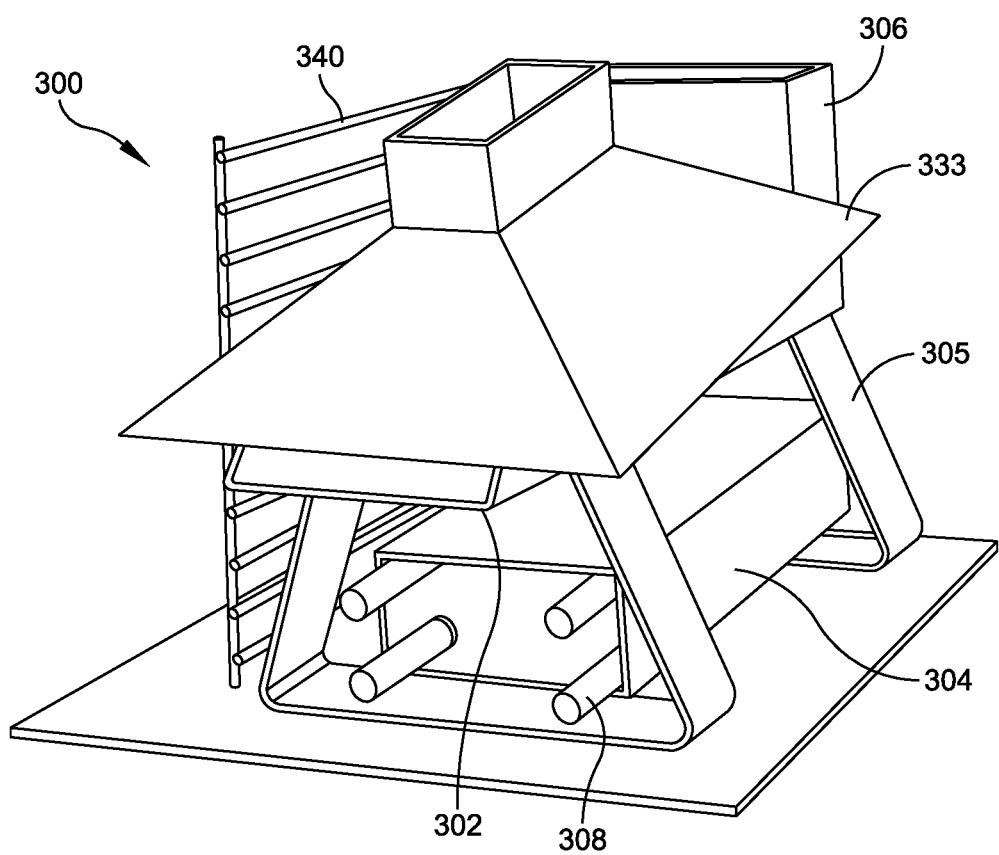
FIG. 14 illustrates a perspective view of the heating and cooking system of FIG. 13 in a disassembled configuration for transport.

FIG. 13 provides a front perspective view of yet another embodiment of a heating and cooking system 300, while FIG. 14 illustrates a perspective view of system 300 with its components in a disassembled arrangement, ready for easy transport. In this embodiment, system 300 may include a horizontal combustion tube 302 that connects at a right angle with vertical chimney 304 via a vertical insert 306. Vertical chimney 304 may exhaust hot air through a barbecue grill 332, which may take the shape of an inverted pyramid 333 outfitted within a conventional cooking grid 340. Like system 100, discussed above, one embodiment of system 300 may include a draft damper 307 and a series of metal pegs 308 for removably connecting vertical chimney 304 with combustion tube 302. Combustion tube 302 may be supported by a pair of legs 305. While systems 100 and 200, discussed above, are portable and designed for use in multiple environments, system 300 provides a compact, more easily transported alternative in the disassembled arrangement shown in FIG. 14.

FIGS. 15A-15C illustrate respective top, side, and front views of a subassembly 322 of heating and cooking system 300. In this embodiment, a combined height, $H_3$, of vertical chimney 304 and vertical insert 306 may be approximately 13 inches, while a height, $h_3$, of combustion tube 302 may be approximately 2 inches. A length, $L_3$, of combustion tube 302 may be approximately 12 inches, and a width, $W_3$, of vertical chimney 304 and combustion tube 302 may be approximately 4 inches. A ground offset, $O_3$, may be scaled as appropriate for system 300. Despite this reduced size, the length-to-length ratio of the combined height, $H_3$, of vertical chimney 304 and vertical insert 306 to a length, $I_3$, of a combustion chamber 301 ($H_3:I_3$) and the width-to-height aspect ratio of combustion tube 302 ($W_3:h_3$) may remain at 4:3 and 2:1, respectively, to optimize heating and fuel efficiency within system 300. In this embodiment, and like system 100 discussed above, metal pegs 308 may be used to removably connect vertical chimney 304 with vertical insert 306. A portion of each peg 308 may be welded or otherwise affixed within vertical chimney 304 such that protruding portions 309 of pegs 308 may be inserted or press fit into and removed from vertical insert 306 for easy assembly and disassembly.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A heating and cooking system, comprising:
 a combustion chamber bounded by top and bottom surfaces, an air intake, and an air exhaust, the combustion chamber configured to contain an amount of natural fuel; and
 a vertical chimney in fluid communication with the air exhaust of the combustion chamber, wherein:
  the top surface bounding the combustion chamber is configured to transfer heat to a first cooking surface;
  the bottom surface bounding the combustion chamber is configured to transfer heat to a second cooking surface; and
  the vertical chimney is configured to transfer heat to a third cooking surface, wherein the combustion chamber is physically isolated from the first and the second cooking surfaces via a sealed configuration that prevents a flow of fluids and a flow of solids between the combustion chamber and both of the first and the second cooking surfaces.

2. The heating and cooking system of claim 1, wherein the combustion chamber is horizontal.

3. The heating and cooking system of claim 1, wherein:
 the first cooking surface comprises a stovetop;
 the second cooking surface comprises an oven drawer, the oven drawer including an open-topped compartment having a bottom wall and four side walls, the oven drawer configured to slide horizontally into and out of the heating and cooking system beneath the bottom surface of the combustion chamber; and
 the third cooking surface comprises a barbecue grill.

4. The heating and cooking system of claim 1, wherein the natural fuel comprises at least one of wood, dried grass, and pine cones.

5. The heating and cooking system of claim 1, wherein the air intake of the combustion chamber has a width-to-height aspect ratio of 2:1.

6. The heating and cooking system of claim 1, wherein:
 the vertical chimney has a first length;
 the combustion chamber has a second length; and
 the first length and said second length have a length-to-length ratio of 4:3.

7. The heating and cooking system of claim 1, wherein the system is portable.

8. The heating and cooking system of claim 7, wherein the vertical chimney is removably attached to the combustion chamber.

9. The heating and cooking system of claim 1, wherein the combustion chamber and the vertical chimney are formed of steel or aluminum.

10. A portable, high-efficiency system for heating and cooking, comprising:

an enclosed combustion chamber, the enclosed combustion chamber having a first end forming an air intake and a second end forming an air outlet; and a vertical exhaust, the vertical exhaust having a first end in fluid communication with an ambient environment and a second end in fluid communication with the air outlet of the enclosed combustion chamber, wherein:

the air intake of the enclosed combustion chamber has a width-to-height aspect ratio of 2:1;

a length of the vertical exhaust and a length of the enclosed combustion chamber have a length-to-length ratio of 4:3;

a top surface bounding the combustion chamber transfers heat to a first cooking surface; and a bottom surface bounding the combustion chamber transfers heat to a second cooking surface that is physically isolated from the combustion chamber by a sealed configuration that prevents a flow of fluids and a flow of solids between the combustion chamber and the second cooking surface.

11. The portable, high-efficiency system of claim 10, wherein:

the vertical exhaust is configured to transfer heat to at least a third cooking surface.

12. The portable, high-efficiency system of claim 11, wherein:

the first cooking surface comprises a stovetop;

the second cooking surface comprises an oven drawer, the oven drawer including an open-topped compartment having a bottom wall and four side walls, the oven drawer configured to slide horizontally into and out of the system beneath the bottom surface of the combustion chamber; and the third cooking surface comprises a barbecue grill.

13. The portable, high-efficiency system of claim 10, further comprising a draft damper, the draft damper configured for incremental insertion into the air intake to control airflow into the portable system.

14. The portable, high-efficiency system of claim 10, further comprising a detachable attachment point between the vertical exhaust and the enclosed combustion chamber.

15. The portable, high-efficiency system of claim 10, wherein the system is formed of steel or aluminum.

16. A multi-functional rocket stove, comprising:

a combustion tube forming a combustion chamber having an air inlet therein, the combustion tube coupled with a vertical exhaust such that air flowing into the system via the air inlet of the combustion chamber exits the system via the vertical exhaust, wherein:

a width-to-height ratio of the air inlet and a length-to-length ratio of the vertical exhaust to the combustion chamber are optimized to achieve maximum fuel efficiency; and the combustion chamber and the vertical exhaust simultaneously transfer heat to at least three cooking surfaces including:

a first cooking surface at a top surface bounding the combustion chamber;

a second cooking surface adjacent a bottom surface bounding the combustion chamber; and a third cooking surface in fluid communication with the vertical exhaust, wherein the combustion chamber is physically isolated from the first and the second cooking surfaces via a sealed configuration that prevents a flow of fluids and a flow of solids between the combustion chamber and both of the first and the second cooking surfaces.

17. The multi-functional rocket stove of claim 16, wherein the width-to-height ratio and the length-to-length ratio are optimized for smoke reduction.

18. The multi-functional rocket stove of claim 17, wherein:

the width-to-height ratio of the air inlet is 2:1; and length-to-length ratio of the vertical exhaust to the combustion chamber is 4:3.

19. The multi-functional rocket stove of claim 16, wherein:

the first cooking surface comprises a stovetop;

the second cooking surface comprises an oven drawer, the oven drawer including a removeable open-topped compartment configured to slide horizontally beneath the bottom surface of the combustion chamber; and the third cooking surface comprises a barbecue grill.

20. The multi-functional rocket stove of claim 16, further comprising a draft damper configured for incremental insertion into the air intake to control the air flowing into the system.

* * * * *